Patented June 21, 1932

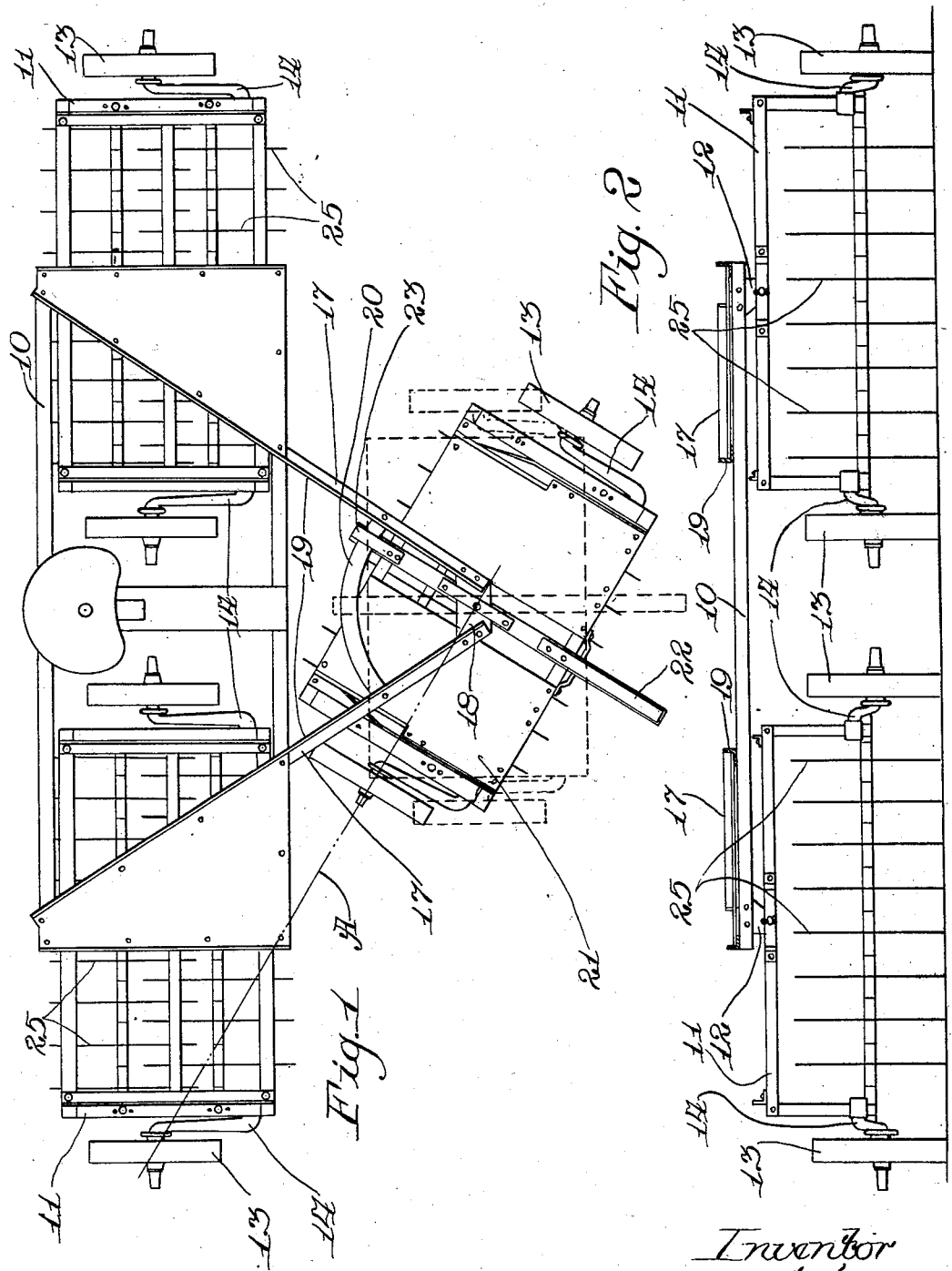

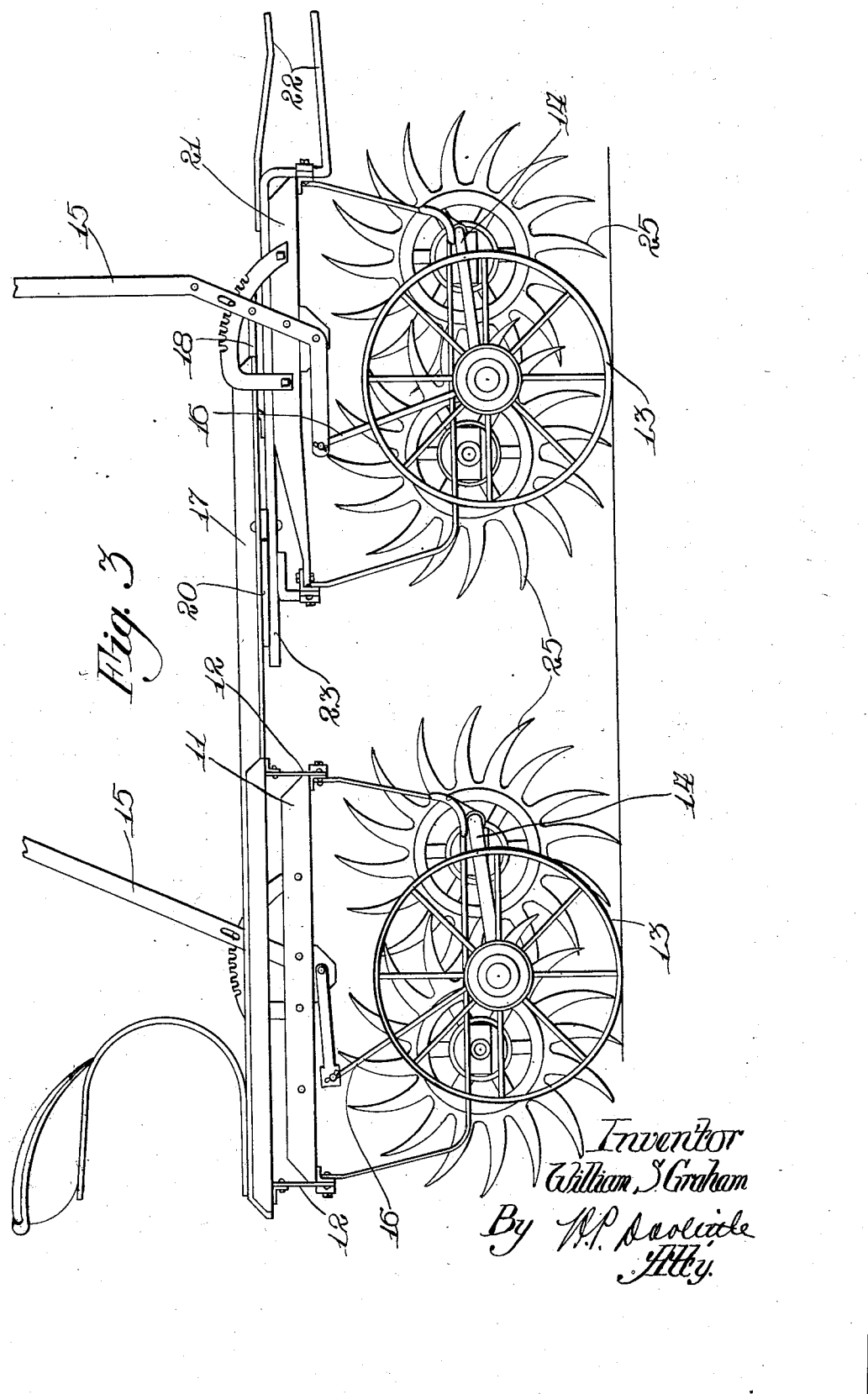

1,864,301

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

WIDE TYPE ROTARY HARROW

Application filed March 24, 1930. Serial No. 438,411.

The present invention relates to tillage machines of the harrow type, and more particularly to the structure of a machine of the wide spread type.

The main object of the invention is to provide a simple and easily guided type of construction for a rotary harrow or similar machine adapted to work the soil across a space equal to three or more plant rows of such crops as corn or cotton.

Another object is to provide a construction which will permit a wide machine to turn short on one of its side wheels as a pivot without causing lateral drag of the tillage tools through the soil during the turning operation. The above and other minor objects and advantages reside in the construction hereinafter more specifically described and illustrated in the accompanying drawings, where—

Figure 1 is a plan view of a wide spread rotary harrow embodying the invention;

Figure 2 is a rear elevation; and,

Figure 3 is an enlarged side view.

In the preferred embodiment of the invention herein disclosed the machine consists of a rear section comprising a laterally extended open frame structure 10 and oblong, laterally disposed frames 11 constituting parts of harrow units mounted at each end of the frame 10. The frame 11 of the harrow units are each pivoted at their centers to depending bearing plates 12 on the front and rear members of the frame 10 and extend beyond the ends of that frame, as seen in Figure 1. Each of these harrow units is supported on ground wheels 13 at the respective ends of each unit, which wheels are preferably mounted on crank axles 14 which are adjustable on the units, as by means of hand levers 15 and links 16 shown in Figure 3. The rear frame 10 has rigidly secured thereto two forwardly extending angle bars 17 which converge toward the central longitudinal line of the machine where they are connected by a bearing plate 18. The converging bars 17 are preferably of angle iron so set as to present inner vertical flanges 19. At a point rearward of the bearing plate 18 the converging members 17 are also connected by an arcuate guide bar 20 for a purpose to be described. The machine also comprises a forward section consisting of a frame 21 carrying a harrow unit similar to the rear units just described. The forward unit is centrally positioned and is of such width as to bridge the space between the inner ends of the rear units. Like the rear units, the front unit is supported on ground wheels 13, which are adjustable through levers 15 in the same manner as the rear units. The frame of the forward unit 21 is centrally swiveled in the bearing plate 18 connecting the front ends of the converging members 17, so that it may be angled horizontally to turn and steer the machine. At the center of the front unit and intersecting its point of pivotal connection and the bearing plate 18, there is secured a draft tongue 22 which is formed with a rearward extension carrying a hammer strap 23.

The arcuate bar 20 is slidably received between the end of the tongue and the strap. As indicated in dotted and full line positions on Figure 1, the arrangement of parts is such that the angular movement of the front unit is limited by contact of the rear end of the tongue 22 with the vertical flanges 19 of the converging bars, and this limit of movement in each direction is so gaged by the angular relation given the bars as to bring the axis of the wheels on the front unit on a line intersecting an end wheel on the rear unit when the limit of turning movement in either direction is reached, as indicated by the line A, Figure 1. By this construction, the front unit can be turned only to a position where the machine as a whole must turn on one end wheel as a pivot, thereby avoiding side drag of the tillage tools through the soil, as would occur if the front unit could be angled beyond the limits fixed by the converging bars 17.

In the present instance the harrow units have been illustrated as comprising front and rear ranks of rotary hoes 25 arranged in overlapped relation, as illustrated, as the general construction is particularly designed for a tool of that type, but the invention is applicable to other tillage elements. The scope of the invention is defined in the following claims.

What is claimed as new is:

1. A wide spread harrow comprising a transversely elongated rear frame, rigid forwardly converging draft bars extending therefrom, a bearing member connecting the front ends of said bars, a wheel supported harrow unit on each end of said frame, a central front harrow unit including a wheel supported frame having a vertical pivotal connection with the bearing member, an arcuate guide bar connecting the draft bars rearwardly of the bearing member, and a central draft tongue secured on the front harrow unit and crossing said bearing member and having its rear end slidably mounted on said arcuate bar.

2. A wide spread harrow comprising a transversely elongated rear section including laterally spaced harrow units having ground wheels on the outer ends thereof, a shorter forward section centrally disposed with respect to the rear section and having a draft connection therewith including a vertical pivot, a ground wheel at each end of said section, and means in said connection for limiting the extremes of angular movement of the front section in either direction to positions in which the axis of the ground wheels thereon is on a line intersecting a wheel on the outer end of the rear section.

3. A wide spread harrow comprising a transversely elongated rear frame having converging bars extending forwardly therefrom and formed with inner vertical flanges, a bearing plate connecting the forward ends of said bars, a wheel supported harrow unit at each end of the rear frame each unit comprising an oblong frame connected at its center to one end of the rear frame, a front harrow unit comprising an oblong wheel supported frame bridging the space between the rear harrow units and swiveled on the bearing plate for angular movement horizontally, an arcuate guide bar connecting the converging bars rearwardly of the bearing plate, and a tongue rigid with the front unit and extending rearwardly on the central line of said unit and slidably engaging the arcuate bar for movement therealong limited by contact with the flanges on the converging bars.

In testimony whereof I affix my signature.

WILLIAM S. GRAHAM.